July 31, 1962    K. W. SPROSON    3,046,655
SHEARS
Filed Nov. 6, 1961

INVENTOR.
Kenneth W. Sproson
BY
ATTORNEY 3,046,655
SHEARS
Kenneth W. Sproson, East Orange, N.J., assignor to
Bedard-Sproson, Inc., New York, N.Y., a corporation of New York
Filed Nov. 6, 1961, Ser. No. 150,261
7 Claims. (Cl. 30—233)

This invention relates to shears, and more particularly concerns shears of the type used for cutting sheet material.

When cutting sheet material with shears of conventional construction, the severed material tends to obscure and interfere with the cutting action of the shears as the same are advanced with each cutting motion.

Accordingly, an object of this invention is to provide improved shears for cutting sheet material wherein means is provided for guiding the severed material in a manner to facilitate the cutting action of the shears.

Another object of this invention is to provide an improved shear construction which includes guiding ribs so disposed as to effectively separate and guide the material being cut, thereby permitting the cutting blades to be readily advanced with each successive cutting motion and thus resulting in a more accurate cutting operation.

Still another object of this invention is to provide improved shears of the character described, in which the interpivoted members are modified to include guide rib portions which are of a shape and dimension which increase the bulk and weight of the shears but slightly and thereby leave the facility of usage of the shears unimpaired.

Other objects of this invention will in part be obvious, and in part hereinafter pointed out.

In the drawing, FIG. 1 is a top plan view of shears embodying the invention;

Figure 1:
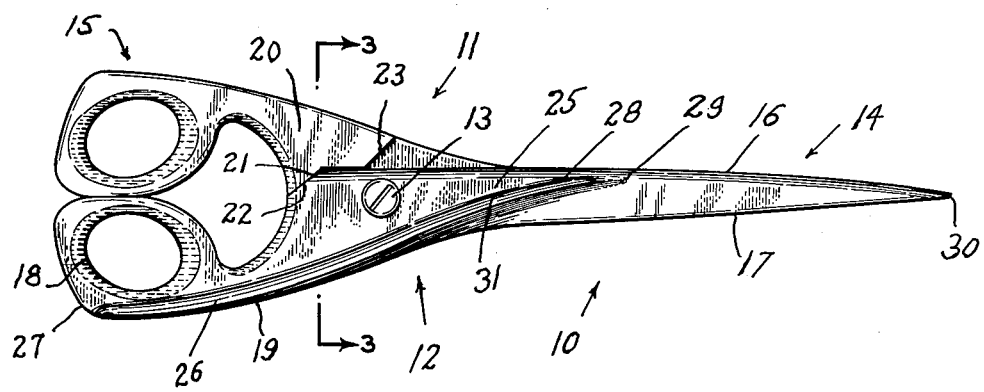

Referring in detail to the drawing, 10 designates a pair of shears embodying the invention. The same comprises a pair of similar lever members 11, 12 which are interpivoted intermediate their ends by a screw and nut as at 13.

Each of the lever members 11, 12 comprises the usual forwardly extending blade portion 14 and a rearwardly extending handle portion 15. The blade portion 14 comprises the outer back edge 16 and the inner cutting edge 17. The handle portion 15 comprises the usual finger hole portion 18 on the inner side thereof and a slightly curved back edge 19 on the outer side thereof.

The forward end of the handle portions 15 are notched on their outer surfaces 20, as at 21, to receive therein the heel portion 22 of the interpivoted lever member; the pivot screw 13 being located immediately forward of said heel portion 22. The pivoted movement of lever members 11, 12 to their open position is limited by stop shoulder portions 23 extending from each of the notches 21 to the back edge 19.

Means is provided for guiding the sheet material which has been freshly severed by the action of the blade portions 14. To this end, each of the lever members 11, 12 is provided with a continuously extending, reversely curved guide rib 24 upstanding from the outer surface 20 of the handle portion 15 and extending forwardly along the outer surface 25 of the blade portion 14.

The rib 24, which may be integrally formed with the lever members 11, 12, includes a rear portion 26 which extends along back edge 19 of handle portion 15 forwardly from the rear end 27 of said handle portion. The rib 24 further includes a forward portion 28 extending to a point 29 on the blade portion 14 and which is adjacent the back edge 16 thereof. Point 29 is located intermediate the tip 30 of the blade portion 14 and the heel portion 22.

The rib portions 26 and 28 are interconnected by a portion 31 which is located intermediate the back edge 16 and the cutting edge 17 of blade portion 14.

Figure 2:
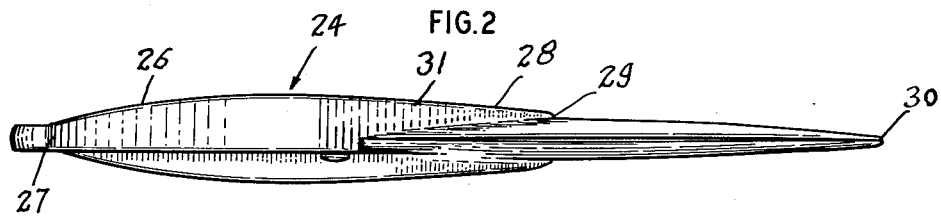
FIG. 2 is a side elevational view thereof.
Figure 3:
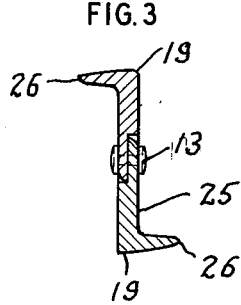
FIG. 3 is a sectional view taken on the line 3—3 of FIG. 1.

As indicated in FIG. 2, the rear rib portion 26 tapers rearwardly rather abruptly to the rear edge 27 of handle portion 15, whereas the forward rib portion 28 tapers forwardly more gradually to point 29.

In using shears 10, the ribs 24 effectively separate and guide the sheet material being cut so as to allow the shears to be more readily advanced after each cutting motion and results in more precise cutting of the sheet material.

While the guide ribs 24 are shown as an integral portion of lever members 11, 12; it is understood that such ribs may be formed separately and attached to the lever members by suitable screw means or the like.

As various changes might be made in the embodiment of the invention herein disclosed without departing from the spirit thereof, it is understood that all matter herein shown or described shall be deemed illustrative and not limiting except as set forth in the appended claims.

What is claimed is:

1. Shears comprising a pair of pivoted lever members, each lever member comprising a blade portion and a handle portion, each of said lever members having an integral rib portion upstanding from the outer face thereof, said rib portion extending continuously along the outer edge of said handle portion and the outer edge of the blade portion associated with said handle portion.

2. Shears as in claim 1 wherein said rib portion tapers toward the end of said handle portion and tapers at the other end thereof to a point intermediate the length of said blade portion.

3. Shears comprising a pair of pivoted lever members, each lever member comprising a blade portion and a handle portion, each of said lever members including a rib extending along the outer edge of the handle portion thereof and outwardly of the face thereof, said rib continuing along the blade portion thereof and terminating at a point intermediate the length of said blade portion and at the outer edge thereof.

4. Shears as in claim 3 wherein said rib tapers longitudinally toward the opposite ends thereof.

5. Shears comprising a pair of lever members interpivoted at a point intermediate the ends thereof, each lever member comprising a blade portion having a back edge and a cutting edge, and a handle portion having a back edge, each lever member having upstanding from the face thereof a rib extending continuously from the rear end of said handle portion to a point intermediate the length of said blade portion, the rear portion of said rib being disposed along the back edge of said handle portion, the forward portion of said rib being disposed along the back edge of said blade portion and the intermediate portion of said rib being disposed immediate the back and cutting edges of said blade portion.

6. Shears as in claim 5 wherein the forward portion of said rib is gradually tapered to the forward end thereof and the rear portion of said rib is abruptly tapered to the rear end thereof.

7. Shears as in claim 6 wherein the height of said rib increases progressively to a maximum at a point intermediate the length of the back edge of said handle portion.

No references cited.